(12) United States Patent
Griffin et al.

(10) Patent No.: US 12,497,895 B1
(45) Date of Patent: Dec. 16, 2025

(54) AIR COOLING SYSTEM FOR STATOR VANE STRUCTURE OUTER PLATFORM

(71) Applicant: RTX Corporation, Farmington, CT (US)

(72) Inventors: David R. Griffin, Tolland, CT (US); Charles T. Slayden, Vernon, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/745,648

(22) Filed: Jun. 17, 2024

(51) Int. Cl.
*F01D 25/12* (2006.01)
*F01D 5/18* (2006.01)

(52) U.S. Cl.
CPC .......... *F01D 5/18* (2013.01); *F05D 2260/232* (2013.01)

(58) Field of Classification Search
CPC . F01D 5/18; F01D 25/12; F01D 25/14; F01D 5/187; F01D 9/06; F01D 9/065; F01D 11/24; F05D 2260/232; F05D 2240/81; F05D 2260/20; F02C 7/12; F02C 7/141; F02C 9/18
See application file for complete search history.

(56) References Cited

U.S. PATENT DOCUMENTS

| | | | |
|---|---|---|---|
| 11,566,532 B2 | 1/2023 | Scialpi | |
| 11,719,115 B2 | 8/2023 | Berdowski | |
| 11,788,425 B2 | 10/2023 | Sharma | |
| 11,859,500 B2 | 1/2024 | Sharma | |
| 2011/0079019 A1* | 4/2011 | Durocher | F01D 25/162 60/796 |
| 2021/0246832 A1* | 8/2021 | Tu | F01D 25/14 |

* cited by examiner

*Primary Examiner* — Steven M Sutherland
(74) *Attorney, Agent, or Firm* — Getz Balich LLC

(57) ABSTRACT

An assembly for a turbine engine includes a vane structure, a wall and an air delivery device. The vane structure includes an inner platform, an outer platform and a plurality of vanes arranged circumferentially about an axis. The inner platform extends circumferentially about the axis and forms an inner peripheral boundary of a flowpath through the vane structure. The outer platform extends circumferentially about the axis and forms an outer peripheral boundary of the flowpath through the vane structure. The vanes extend across the flowpath from the inner platform to the outer platform. The wall extends circumferentially about the axis. The wall is radially outboard of the vane structure with a cavity formed by and radially between the outer platform and the wall. The air delivery device is disposed within the cavity. The air delivery device is configured to direct cooling air into the cavity along the outer platform.

17 Claims, 9 Drawing Sheets

AIR COOLING SYSTEM FOR STATOR VANE STRUCTURE OUTER PLATFORM

BACKGROUND OF THE DISCLOSURE

1. Technical Field

This disclosure relates generally to a turbine engine and, more particularly, to an air cooling system for the turbine engine.

2. Background Information

A turbine engine may include an active clearance control system for directing cooling air against a backside of a case. Various other air cooling systems are also known in the art for a turbine engine. While these known air cooling systems have various benefits, there is still room in the art for improvement.

SUMMARY OF THE DISCLOSURE

According to an aspect of the present disclosure, an assembly is provided for a turbine engine. This assembly includes a vane structure, a wall and an air delivery device. The vane structure includes an inner platform, an outer platform and a plurality of vanes arranged circumferentially about an axis. The inner platform extends circumferentially about the axis and forms an inner peripheral boundary of a flowpath through the vane structure. The outer platform extends circumferentially about the axis and forms an outer peripheral boundary of the flowpath through the vane structure. The vanes extend across the flowpath from the inner platform to the outer platform. The wall extends circumferentially about the axis. The wall is radially outboard of the vane structure with a cavity formed by and radially between the outer platform and the wall. The air delivery device is disposed within the cavity. The air delivery device is configured to direct cooling air into the cavity along the outer platform.

According to another aspect of the present disclosure, another assembly is provided for a turbine engine. This assembly includes a mid-turbine frame and an air delivery device. The mid-turbine frame extends circumferentially about and axially along an axis. The mid-turbine frame includes an inner platform, an outer platform and a plurality of vanes that extend radially between and are connected to the inner platform and the outer platform. The air delivery device is radially outboard of the outer platform. The air delivery device includes a plurality of outlets arranged axially along the outer platform. The air delivery device is configured to direct air into an air gap through the outlets. The air gap extends from the outer platform to an inner periphery of the air delivery device.

According to still another aspect of the present disclosure, an air delivery device is provided for a turbine engine. This air delivery device includes a first manifold, a second manifold, a third manifold, a plurality of first conduits and a plurality of second conduits. The first manifold extends circumferentially around an axis. The first manifold includes a plurality of first outlets arranged circumferentially around the axis in a first outlet array. Each of the first outlets pierces a sidewall of the first manifold at a radial inner periphery of the first manifold. The second manifold extends circumferentially around the axis. The second manifold includes a plurality of second outlets arranged circumferentially around the axis in a second outlet array. Each of the second outlets pierces a sidewall of the second manifold at a radial inner periphery of the second manifold. An inner radius from the axis to the radial inner periphery of the second manifold is greater than an inner radius from the axis to the radial inner periphery of the first manifold. The third manifold extends circumferentially around the axis. The third manifold includes a plurality of third outlets arranged circumferentially around the axis in a third outlet array. Each of the third outlets pierces a sidewall of the third manifold at a radial inner periphery of the third manifold. An inner radius from the axis to the radial inner periphery of the third manifold is greater than the inner radius from the axis to the radial inner periphery of the second manifold. The first conduits are arranged circumferentially about the axis in a first conduit array. Each of the first conduits extends axially from the first manifold to the second manifold. Each of the first conduits fluidly couples the first manifold to the second manifold. The second conduits are arranged circumferentially about the axis in a second conduit array. Each of the second conduits extends axially from the second manifold to the third manifold. Each of the first conduits fluidly couples the second manifold to the third manifold.

The assembly may also include an engine case circumscribing the outer platform. The air delivery device may be disposed in a cavity formed by and extending radially between the outer platform and the engine case. The air gap may include a portion of the cavity radially between the air delivery device and the outer platform.

The air delivery device may include a plurality of outlets arranged axially along the axis. Each of the outlets may be configured to direct a flow of the cooling air into the cavity.

The air delivery device may include a plurality of outlets arranged circumferentially about the axis. Each of the outlets may be configured to direct a flow of the cooling air into the cavity.

The air delivery device may include a plurality of first outlets and a plurality of second outlets. The first outlets may be arranged circumferentially about the axis in a first outlet array. The second outlets may be arranged circumferentially about the axis in a second outlet array. The second outlet array may be axially offset from the first outlet array along the axis. Each of the first outlets and each of the second outlets may be configured to direct a flow of the cooling air into the cavity.

The air delivery device may also include a first manifold, a second manifold and a conduit. The first manifold may extend circumferentially about the axis. Each of the first outlets may extend through a sidewall of the first manifold. The second manifold may extend circumferentially about the axis. Each of the second outlets may extend through a sidewall of the second manifold. The conduit may extend axially between and fluidly couple the first manifold and the second manifold.

The conduit may be one of a plurality of conduits arranged circumferentially about the axis in a conduit array. Each of the conduits may extend axially between and may fluidly couple the first manifold and the second manifold.

The air delivery device may also include a plurality of third outlets, a third manifold and a second conduit. The third outlets may be arranged circumferentially about the axis in a third outlet array. The second outlet array may be disposed axially between and offset from the first outlet array and the third outlet array along the axis. The third manifold may extend circumferentially about the axis. Each of the third outlets may extend through a sidewall of the third manifold. The second conduit may extend axially between and may fluidly couple the second manifold and the third manifold.

The second conduit may be one of a plurality of second conduits arranged circumferentially about the axis in a second conduit array. Each of the second conduits may extend axially between and may fluidly couple the second manifold and the third manifold.

The first outlet array and the second outlet array may be axially aligned with the vanes.

The first outlet array may be axially aligned with the vanes. The second outlet array may be axially offset from the vanes.

The first outlet array and the second outlet array may be axially offset from the vanes with the vanes disposed axially between the first outlet array and the second outlet array along the axis.

The wall may be configured as or otherwise include a turbine engine case housing the vane structure.

The assembly may also include a mid-turbine frame, and the mid-turbine frame may be or otherwise include the vane structure.

The assembly may also include a first turbine rotor and a second turbine rotor. The first turbine rotor may be configured to rotate about the axis. The second turbine rotor may be configured to rotate about the axis independent of the first turbine rotor. The flowpath may extend across the first turbine rotor, through the vane structure, and then across the second turbine rotor.

The assembly may also include a support structure, a rotating assembly and a plurality of struts. The support structure may be radially inboard of the vane structure. The rotating assembly may be rotatably mounted to the support structure. The rotating assembly may include a turbine rotor next to the vane structure. The flowpath may extend across the turbine rotor. The struts may be arranged circumferentially about the axis. Each of the struts may extend through a respective one of the vanes. The struts may structurally tie the support structure to the wall.

The assembly may also include a compressor section, a combustor section and a turbine section. The flowpath may extend through the compressor section, the combustor section and the turbine section from an inlet into the flowpath to an exhaust from the flowpath. The vane structure may be disposed along the flowpath within the turbine section.

The turbine section may include a high pressure turbine section and a low pressure turbine section. The vane structure may be disposed along the flowpath between the high pressure turbine section and the low pressure turbine section.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
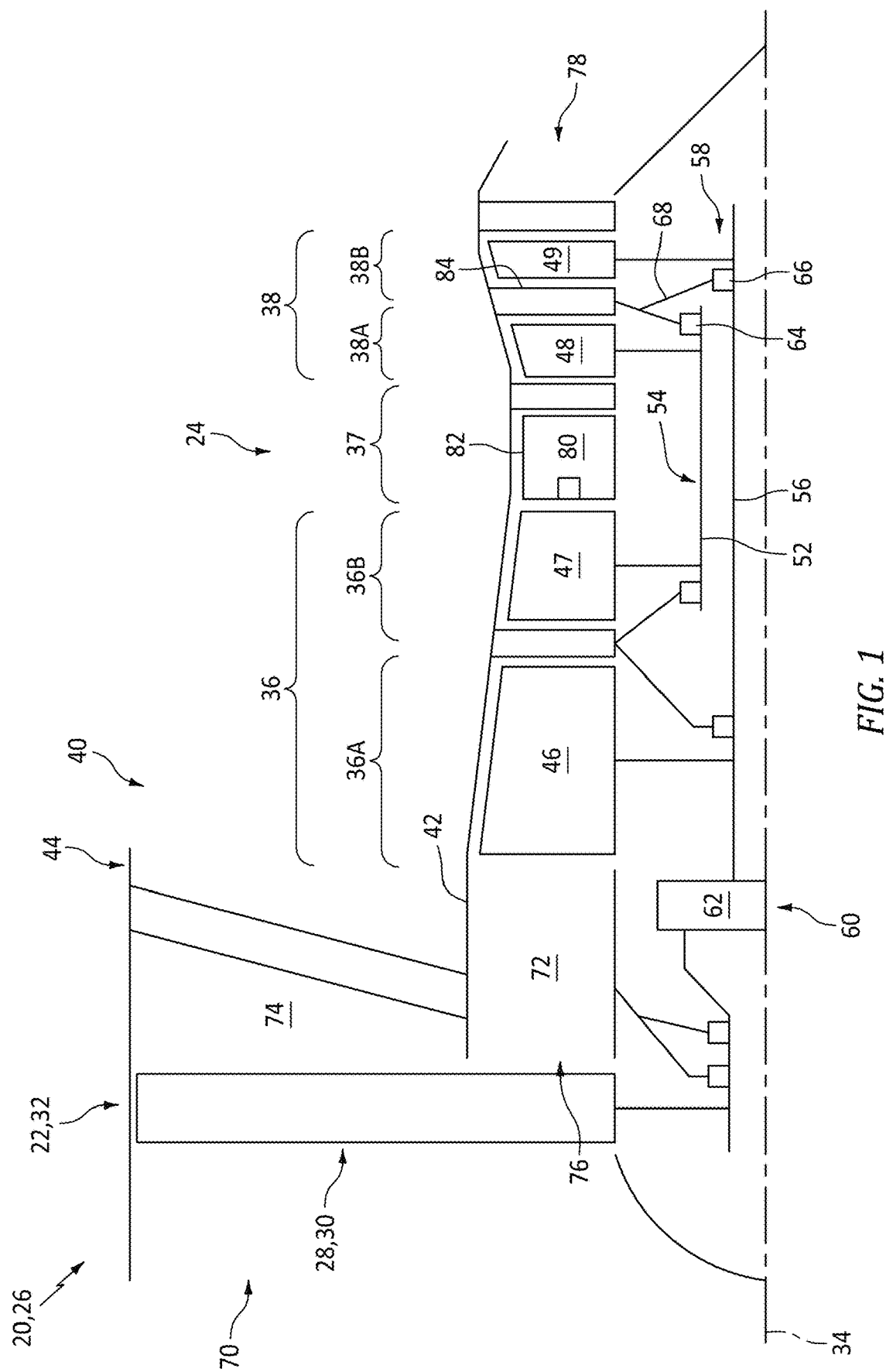
FIG. 1 is a partial side schematic illustration of an aircraft powerplant.

FIG. 1 illustrates a powerplant 20 for an aircraft. The aircraft may be an airplane, a helicopter, a drone (e.g., an unmanned aerial vehicle (UAV)) or any other manned or unmanned aerial vehicle or system. The powerplant 20 may be configured as, or otherwise included as part of, a propulsion system for the aircraft. The powerplant 20 may also or alternatively be configured as, or otherwise included as part of, an electrical power system for the aircraft. The powerplant 20 of FIG. 1 includes a mechanical load 22 and a core 24 of a gas turbine engine 26 configured to power operation of the mechanical load 22.

The mechanical load 22 may be configured as or otherwise include a rotor 28 mechanically driven by the engine core 24. This driven rotor 28 may be a bladed propulsor rotor where the aircraft powerplant 20 is or part of the aircraft propulsion system. The propulsor rotor, for example, may be a ducted propulsor rotor or an open propulsor rotor; e.g., an un-ducted propulsor rotor. An example of the ducted propulsor rotor is a fan rotor 30 where the turbine engine 26 is a turbofan engine. Examples of the open propulsor rotor include: a propeller where the turbine engine 26 is a turboprop engine; a rotorcraft rotor (e.g., a main helicopter rotor) where the turbine engine 26 is a turboshaft engine; a propfan rotor where the turbine engine 26 is a propfan engine; and a pusher fan rotor where the turbine engine 26 is a pusher fan engine. The present disclosure, of course, is not limited to the foregoing exemplary propulsor rotor configurations nor to the foregoing exemplary aircraft propulsion system configurations. Alternatively, the driven rotor 28 may be a generator rotor in an electric power generator where the aircraft powerplant 20 is or part of the electric power system; e.g., an auxiliary power unit (APU) for the aircraft. However, for ease of description, the mechanical load 22 is generally described below as a fan section 32 of the turbine engine 26, and the driven rotor 28 is generally described below as the fan rotor 30 within the fan section 32.

The turbine engine 26 extends axially along an axis 34 from a first (e.g., upstream, forward) end of the turbine engine 26 to a second (e.g., downstream, aft) end of the turbine engine 26. This axis 34 may be a centerline axis of the turbine engine 26, the engine core 24 and/or one or more members of the turbine engine 26. The axis 34 may also or alternatively be a rotational axis of one or more rotating members of the turbine engine 26 and its engine core 24. The engine core 24 includes a compressor section 36, a combustor section 37 and a turbine section 38. The compressor section 36 of FIG. 1 includes a low pressure compressor (LPC) section 36A and a high pressure compressor (HPC) section 36B. The turbine section 38 of FIG. 1 includes a high pressure turbine (HPT) section 38A and a low pressure turbine (LPT) section 38B.

The engine sections 32 and 36A-38B of FIG. 1 are arranged within an engine housing 40. This engine housing 40 includes an inner case 42 (e.g., a core case) and an outer case 44 (e.g., a fan case). The inner case 42 of FIG. 1 houses the engine core 24 and its engine sections 36A-38B. The outer case 44 of FIG. 1 houses the fan section 32.

The LPC section 36A includes a low pressure compressor (LPC) rotor 46. The HPC section 36B includes a high pressure compressor (HPC) rotor 47. The HPT section 38A includes a high pressure turbine (HPT) rotor 48. The LPT section 38B includes a low pressure turbine (LPT) rotor 49. Each of these engine rotors 46-49 and the fan rotor 30 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The HPC rotor 47 is coupled to and rotatable with the HPT rotor 48. The HPC rotor 47 of FIG. 1, for example, is connected to the HPT rotor 48 by a high speed shaft 52. At least (or only) the HPC rotor 47, the HPT rotor 48 and the high speed shaft 52 collectively form a high speed rotating assembly 54; e.g., a high speed spool of the engine core 24.

The LPC rotor 46 is coupled to and rotatable with the LPT rotor 49. The LPC rotor 46 of FIG. 1, for example, is connected to the LPT rotor 49 by a low speed shaft 56. At least (or only) the LPC rotor 46, the LPT rotor 49 and the low speed shaft 56 collectively form a low speed rotating assembly 58; e.g., a low speed spool of the engine core 24. The low speed rotating assembly 58 is further coupled to the fan rotor 30 (the driven rotor 28) through a drivetrain 60. This drivetrain 60 may be configured as a geared drivetrain, where a geartrain 62 (e.g., a transmission, a speed change device, an epicyclic geartrain, etc.) is disposed between and operatively couples the fan rotor 30 to the low speed rotating assembly 58 and its LPT rotor 49. With this arrangement, the fan rotor 30 may rotate at a different (e.g., slower) rotational velocity than the low speed rotating assembly 58 and its LPT rotor 49. However, the drivetrain 60 may alternatively be configured as a direct drive drivetrain, where the geartrain 62 is omitted. With this arrangement, the fan rotor 30 may rotate at a common (the same) rotational velocity as the low speed rotating assembly 58 and its LPT rotor 49.

Each of the rotating assemblies 54 and 58 of FIG. 1 and its members are rotatably supported by a plurality of bearings (e.g., 64 and 66); e.g., rolling element and/or thrust bearings. Each of these bearings is connected to the engine housing 40 by at least one stationary support structure (e.g., 68) such as, for example, a bearing support frame. Each of the rotating assemblies 54, 58 and its members is thereby rotatable about a respective rotational axis, and each of these rotational axes may be parallel (e.g., coaxial) with the axis 34.

During operation of the turbine engine 26 of FIG. 1, ambient air enters the turbine engine 26 through an airflow inlet 70. This air is directed through the fan section 32 and into a core flowpath 72 (e.g., annular core flowpath) and a bypass flowpath 74 (e.g., annular bypass flowpath). The core flowpath 72 extends through the engine core 24 and sequentially through the engine sections 36A-38B from an airflow inlet 76 into the core flowpath 72 to a combustion products exhaust 78 from the core flowpath 72. The core flowpath 72 thereby extends sequentially across the LPC rotor 46, the HPC rotor 47, the HPT rotor 48 and the LPT rotor 49 between the core inlet 76 and the core exhaust 78. The air within the core flowpath 72 may be referred to as "core air". The bypass flowpath 74 extends through a bypass duct and bypasses (e.g., is radially outboard of and extends along) the engine core 24 and its inner case 42. The air within the bypass flowpath 74 may be referred to as "bypass air".

The core air is compressed by the LPC rotor 46 and the HPC rotor 47 and directed into a combustion chamber 80 (e.g., an annular combustion chamber) of a combustor 82 (e.g., an annular combustor) in the combustor section 37. Fuel is injected into the combustion chamber 80 by one or more fuel injectors and mixed with the compressed core air to provide a fuel-air mixture. This fuel-air mixture is ignited and combustion products thereof flow through and sequentially drive rotation of the HPT rotor 48 and the LPT rotor 49. The rotation of the HPT rotor 48 and the LPT rotor 49 respectively drive rotation of the HPC rotor 47 and the LPC rotor 46 and, thus, compression of the air received from the core inlet 76. The rotation of the LPT rotor 49 also drives rotation of the fan rotor 30 (the driven rotor 28). The rotation of the fan rotor 30 propels the bypass air through the bypass flowpath 74 and out of the turbine engine 26 to provide thrust. The propulsion of the bypass air may account for a majority of the thrust generated by the aircraft propulsion system.

Figure 2:
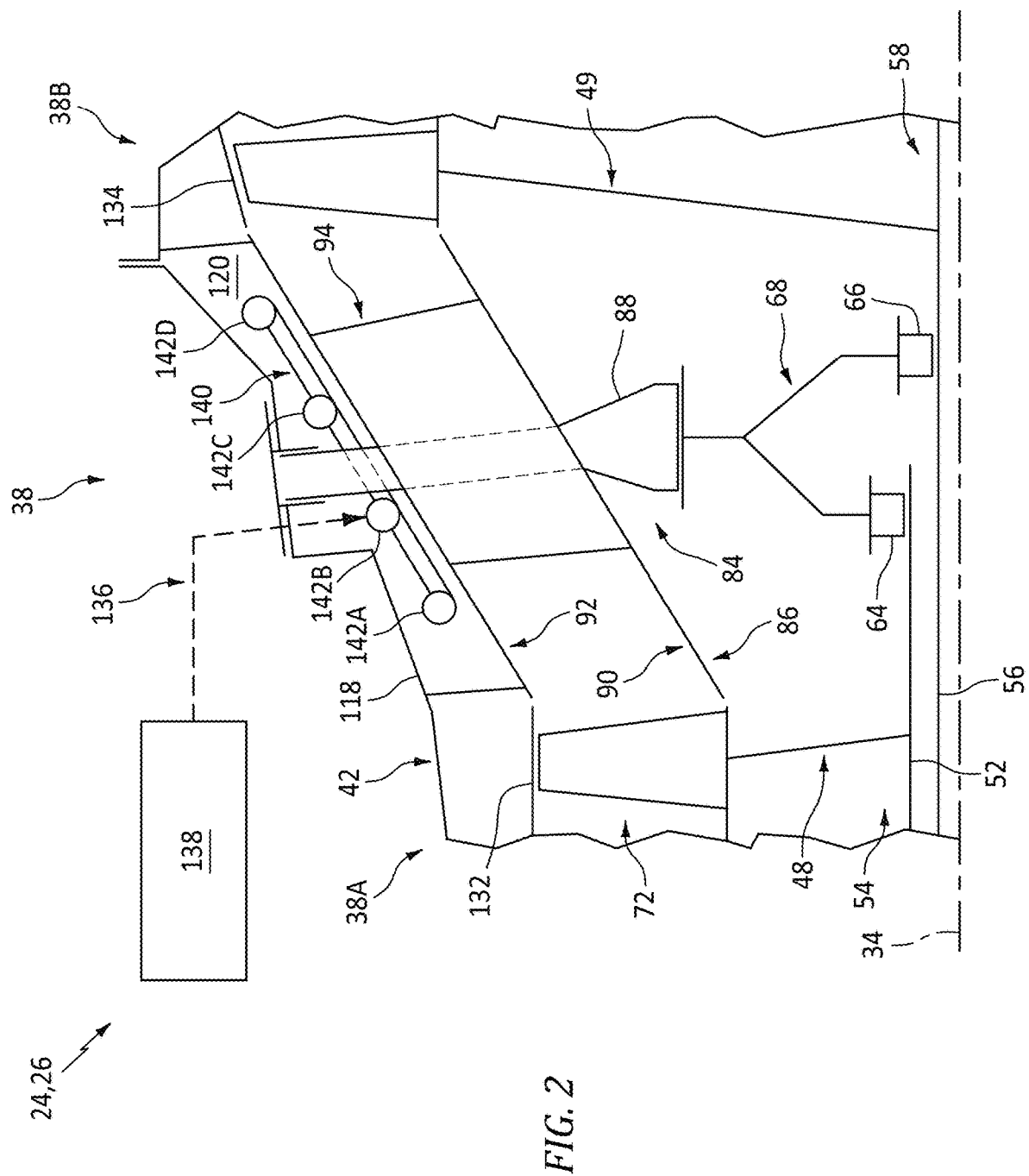
FIG. 2 is a side schematic illustration of a portion of the aircraft powerplant at a mid-turbine frame.

Referring to FIG. 2, the turbine section 38 includes the HPT rotor 48, the LPT rotor 49 and a mid-turbine frame 84. The mid-turbine frame 84 is arranged axially along the axis 34, and longitudinally along the core flowpath 72, between (a) the HPT section 38A and its HPT rotor 48 and (b) the LPT section 38B and its LPT rotor 49. This mid-turbine frame 84 is configured to support one or more of the rotating assemblies 54 and 58. The mid-turbine frame 84 of FIG. 2, for example, include the support structure 68, a stator vane structure 86 (e.g., a mid-turbine vane assembly) and a plurality of struts 88. Briefly, the high speed rotating assembly 54 and its high speed shaft 52 and the low speed rotating assembly 58 and its low speed shaft 56 are respectively rotatably mounted to the support structure 68 of FIG. 2 through the bearings 64 and 66.

Figure 3:
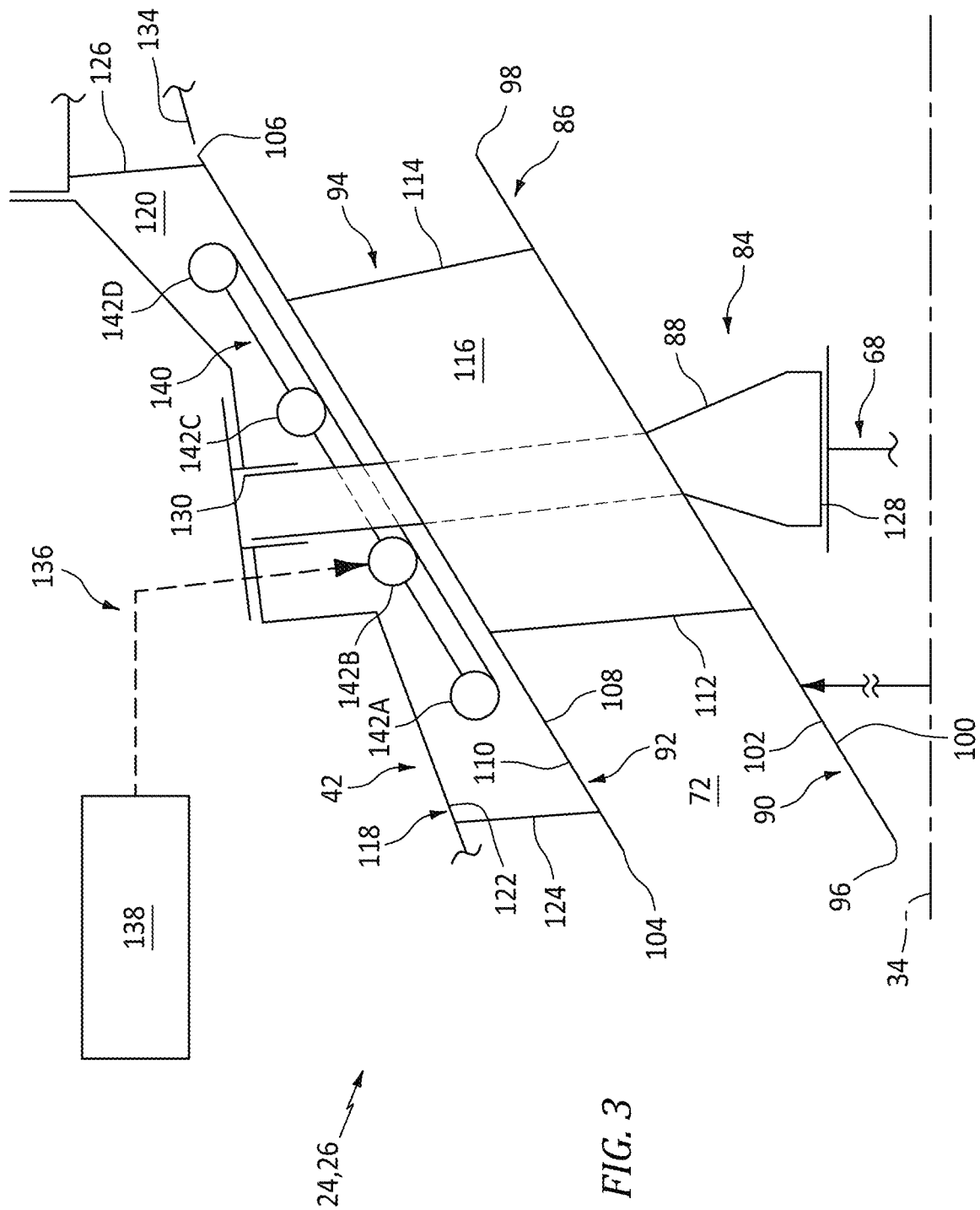
FIG. 3 is another side schematic illustration of a portion of the aircraft powerplant at the mid-turbine frame.
Figure 4:
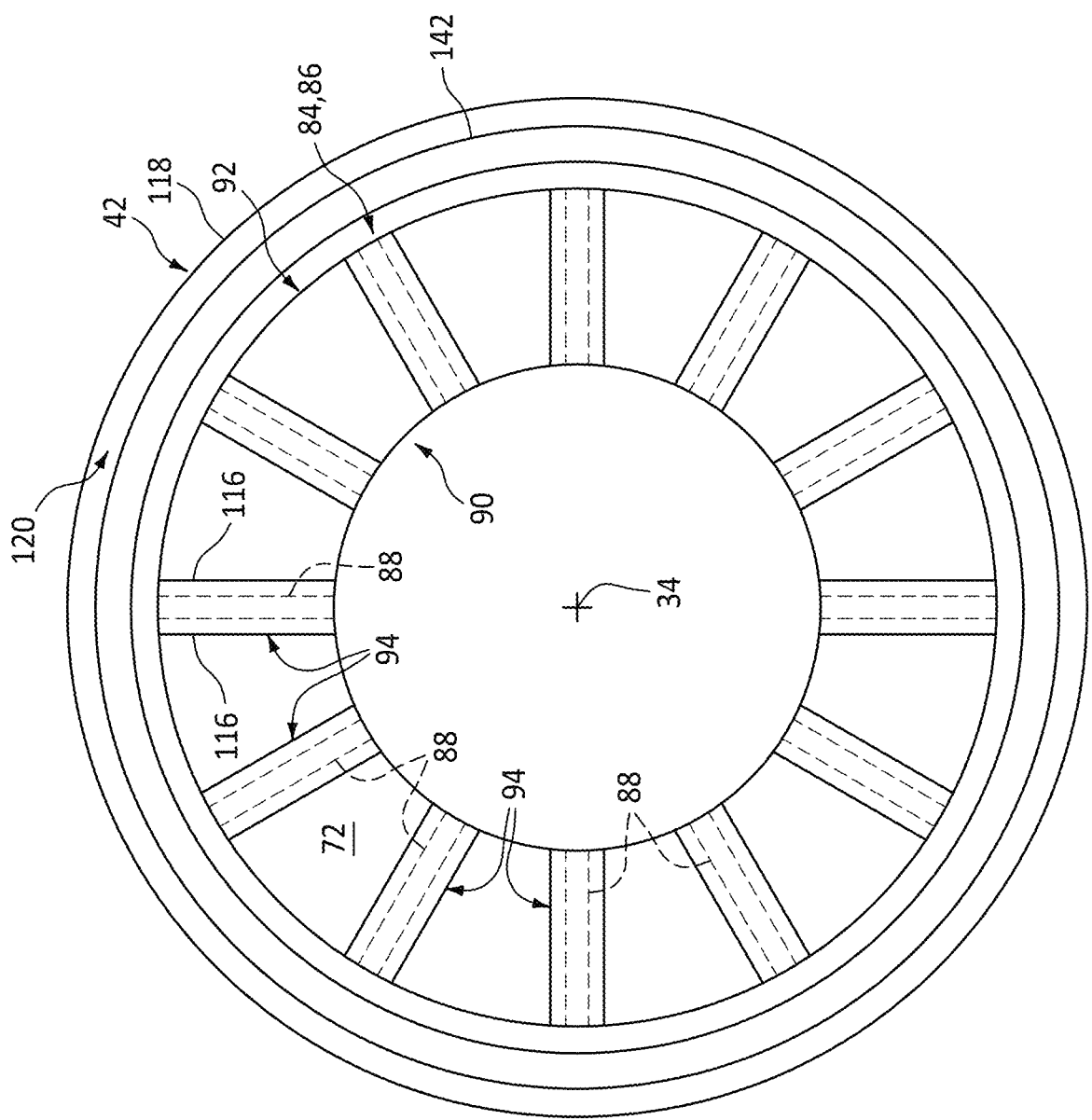
FIG. 4 is an end view illustration of a portion of the aircraft powerplant at the mid-turbine frame.

Referring to FIG. 3, the vane structure 86 includes a radial inner platform 90, a radial outer platform 92 and a plurality of stator vanes 94. The inner platform 90 extends axially along the axis 34, and longitudinally along the core flowpath 72, from an upstream end 96 of the inner platform 90 to a downstream end 98 of the inner platform 90. The inner platform 90 extends radially from a radial inner side 100 of the inner platform 90 to a radial outer side 102 of the inner platform 90. Referring to FIG. 4, the inner platform 90 extends circumferentially about (e.g., completely around) the axis 34, providing the inner platform 90 with a full-hoop (e.g., tubular) geometry for example. At the inner platform outer side 102 of FIG. 3, the inner platform 90 forms a radial inner peripheral boundary of a longitudinal section of the core flowpath 72 which extends through the vane structure 86 from the HPT section 38A to the LPT section 38B (see FIG. 2).

The outer platform 92 extends axially along the axis 34, and longitudinally along the core flowpath 72, from an upstream end 104 of the outer platform 92 to a downstream end 106 of the outer platform 92. The outer platform 92 extends radially from a radial inner side 108 of the outer platform 92 to a radial outer side 110 of the outer platform 92. Referring to FIG. 4, the outer platform 92 extends circumferentially about (e.g., completely around) the axis 34, providing the outer platform 92 with a full-hoop (e.g., tubular) geometry for example. At the outer platform inner side 108 of FIG. 3, the outer platform 92 forms a radial outer peripheral boundary of the longitudinal section of the core flowpath 72 which extends through the vane structure 86 from the HPT section 38A to the LPT section 38B (see FIG. 2).

Figure 5:
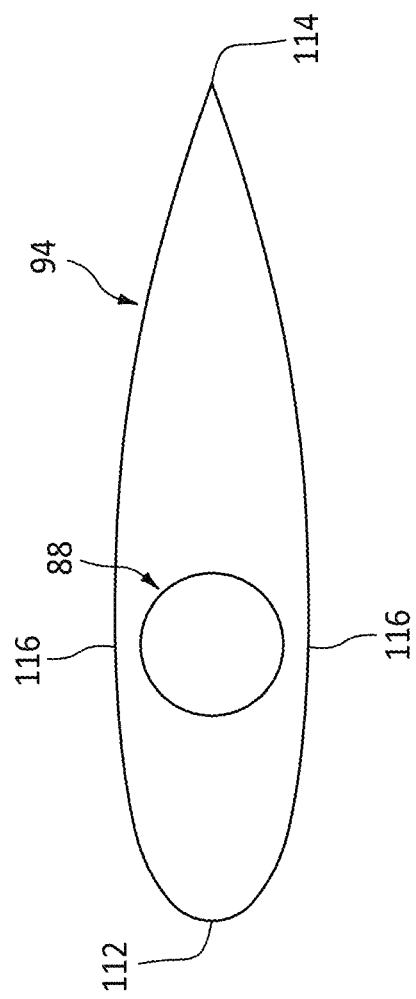
FIG. 5 is a cross-sectional schematic illustration of a stator vane with a strut.

Referring to FIG. 4, the stator vanes 94 are arranged and may be equispaced circumferentially about the axis 34 in an annular vane array. This vane array and its stator vanes 94 are disposed radially between the inner platform 90 and the outer platform 92. Referring to FIG. 3, each of the stator vanes 94 extends spanwise (e.g., radially) across the core flowpath 72 from the inner platform 90 to the outer platform 92. Each of the stator vanes 94 is also connected to the inner platform 90 and the outer platform 92. Each of the stator vanes 94 extends chordwise from a leading edge 112 of the respective stator vane 94 to a trailing edge 114 of the respective stator vane 94. The vane leading edge 112 of FIG. 3 is axially/longitudinally recessed (e.g., spaced downstream) from the upstream ends 96 and 104 of the inner platform 90 and the outer platform 92. The vane trailing edge 114 of FIG. 3 is axially/longitudinally recessed (e.g., spaced upstream) from the downstream ends 98 and 106 of the inner platform 90 and the outer platform 92. Referring to FIG. 5, each of the stator vanes 94 extends laterally (e.g., generally circumferentially) between opposing sides 116 of the respective stator vane 94, where these vane sides 116 extend chordwise between and meet at the vane leading edge 112 and the vane trailing edge 114. Referring to FIG. 3, each of the vane elements 112, 114 and 116 may project spanwise out from the inner platform outer side 102 to the outer platform inner side 108.

The vane structure 86 is disposed radially outboard of and is spaced from the support structure 68. The vane structure 86 axially overlaps and circumscribes the support structure 68. The vane structure 86 is disposed radially inboard of and is spaced from a wall 118 of the inner case 42. The inner case 42 and its case wall 118 axially overlap and circumscribe the vane structure 86. A cooling cavity 120 is also formed by the outer platform 92 and the case wall 118. This cooling cavity 120 projects radially out from the outer platform outer side 110 to a radial inner side 122 of the case wall 118. The cooling cavity 120 extends axially and longitudinally along the vane structure 86 and its outer platform 92 between opposing axial ends. The cavity first end of FIG. 3 is formed by a first structure 124 (e.g., a seal structure, a flange structure, a hanger, etc.) extending radially between the connected to (or otherwise engaged with) the outer platform 92 and the case wall 118. Here, the first structure 124 is disposed at (e.g., on, adjacent or proximate) the outer platform upstream end 104. The cavity second end of FIG. 3 is formed by a second structure 126 (e.g., a seal structure, a flange structure, a hanger, etc.) extending radially between the connected to (or otherwise engaged with) the outer platform 92 and the case wall 118. Here, the second structure 126 is disposed at the outer platform downstream end 106. Referring to FIG. 4, the cooling cavity 120 extends circumferentially about (e.g., completely around) the axis 34, providing the cooling cavity 120 with a full-hoop (e.g., annular) geometry for example.

The struts 88 are arranged and may be equispaced circumferentially about the axis 34 in an annular strut array. In the schematic illustration of FIG. 4, each of the struts 88 is associated with a respective one of the stator vanes 94 such that there is a one-to-one relationship between the number of the struts 88 and the number of the stator vanes 94. However, it is contemplated there may be fewer struts 88 than stator vanes 94 in other embodiments. For example, there may be a two-to-one or a three-to-one relationship between the number of the struts 88 and the number of the stator vanes 94.

Referring to FIG. 3, each of the struts 88 projects through a bore of a respective one of the stator vanes 94 from an inner end 128 of the respective strut 88 to an outer end 130 of the respective strut 88. Each strut 88 is connected to the support structure 68 at the strut inner end 128. Each strut 88 is connected to the inner case 42 and its case wall 118 at the strut outer end 130. Each strut 88 is configured to provide a (e.g., axial) load path between the support structure 68 and the inner case 42 and its case wall 118, which load path is independent of the vane structure 86. With this arrangement, the struts 88 structurally ties the support structure 68 to the inner case 42; e.g., structurally independent of the vane structure 86.

During turbine engine operation, the combustion products flowing through the core flowpath 72 across the vane structure 86 subject the outer platform 92 to relatively hot temperatures. Such hot temperature may induce circumferential thermal distortions (e.g., lobing) in the outer platform 92. In addition, an uneven distribution of cooling air to/around a radial outer periphery of the vane structure 86 may also induce circumferential thermal distortions in the outer platform 92, particularly given the relatively large thermal gradient across the outer platform 92 between the relatively cool cooling air and the relatively hot combustion products. Such distortions may negatively affect a contour of the outer peripheral boundary of the core flowpath 72 across the vane structure 86 as well as open one or more leakage gaps between the outer platform 92 and adjacent blade outer air seals 132 and 134 (BOASs) (see FIG. 2), also sometimes referred to as rotor shrouds. To reduce or prevent such thermal distortions of the vane structure 86 and its outer platform 92, the turbine engine 26 of FIG. 3 includes a cooling air system 136 to provide an even distribution of cooling air to the vane structure 86. This cooling air system 136 includes a cooling air source 138 and an air delivery device 140 fluidly coupled with and downstream of the cooling air source 138. Briefly, the cooling air source 138 may be a bleed from the core flowpath 72 along the compressor section 36 (see FIG. 1) or any other source of pressurized, relatively cool air.

Figure 6:
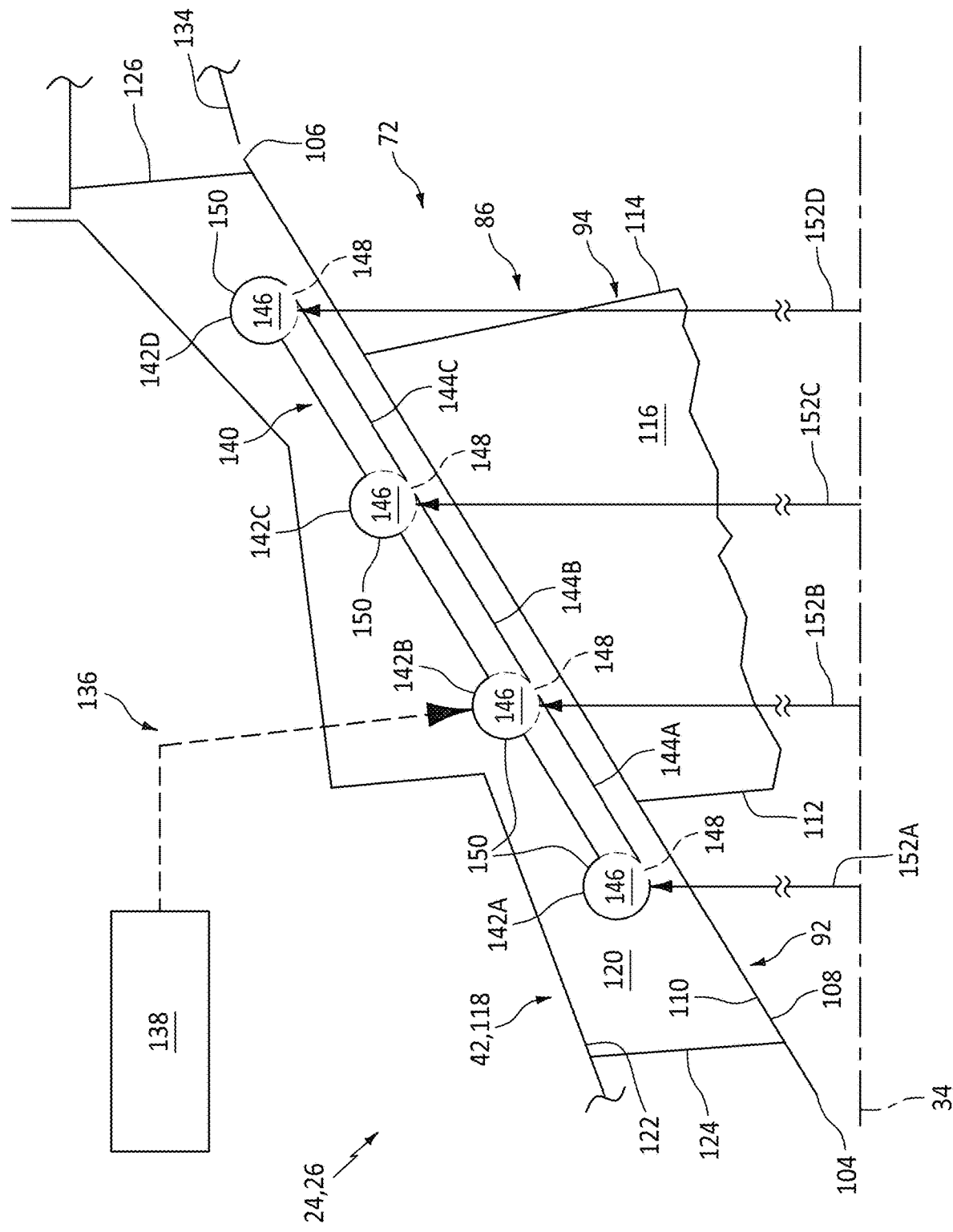
FIG. 6 is a side schematic illustration of a portion of the aircraft powerplant at an air delivery device.

Referring to FIG. 6, the air delivery device 140 includes one or more air delivery manifolds 142A-D (generally referred to as "142"). The air delivery device 140 of FIG. 6 also includes one or more conduits 144A-C (generally referred to as "144") for fluidly coupling the air delivery manifolds 142 together; see also FIG. 7. The air delivery device 140 is disposed within the cooling cavity 120. The air delivery device 140 and each of its members 142 and 144 are radially spaced outward from the outer platform 92 by an inner air gap; e.g., an inner portion of the cooling cavity 120. The air delivery device 140 and each of its members 142 and 144 may be radially spaced inward from the case wall 118 by an outer air gap; e.g., an outer portion of the cooling cavity 120.

Each of the air delivery manifolds 142 extends circumferentially about (e.g., completely around) the axis 34, providing the respective air delivery manifold 142 with a full-hoop (e.g., annular) geometry for example. Each of the air delivery manifolds 142 includes an interior manifold passage 146 (e.g., an annular inner bore) and one or more air outlets 148. The air outlets 148 are arranged and may be equispaced circumferentially about the axis 34 and along the manifold passage 146 in an outlet array; see also FIG. 7. Each of these air outlets 148 projects through (e.g., pierces)

a sidewall 150 of the respective air delivery manifold 142 from the manifold passage 146 to the cooling cavity 120. Each air outlet 148 thereby fluidly couples the manifold passage 146 to the cooling cavity 120. The air outlets 148 of FIG. 6 are disposed at a radial inner periphery of the respective air delivery manifold 142. With this arrangement, a trajectory of a centerline of each air outlet 148 may point radially inwards towards and may be coincident with the outer platform outer side 110.

The air delivery manifolds 142 are arranged axially/longitudinally along the outer platform 92. The first-end manifold 142A of FIG. 6, for example, is disposed axially/longitudinally at the vane leading edges 112. This first-end manifold 142A may be (e.g., slightly) axially/longitudinally offset from (e.g., spaced upstream from relative to the core flowpath 72) the stator vanes 94 and their leading edges 112. The second-end 142D of FIG. 6 is disposed axially/longitudinally at the vane trailing edges 114. This second-end 142D may be (e.g., slightly) axially/longitudinally offset from (e.g., spaced downstream from relative to the core flowpath 72) the stator vanes 94 and their trailing edges 114. The one or more intermediate manifolds 142B and 142C are disposed axially/longitudinally between and may (or may not) be equispaced between the first-end manifold 142A and the second-end 142D. These intermediate manifolds 142B and 142C are axially/longitudinally aligned with and overlap the stator vanes 94. Here, the strut array and its struts 88 are disposed axially/longitudinally between the intermediate manifolds 142B and 142C.

Each of the air delivery manifolds 142 has an inner radius 152A-D (generally referred to as "152") which extend from the axis 34 to the inner periphery of the respective air delivery manifold 142; e.g., at or near a location of the respective outlet array. With the arrangement of FIG. 6, the first-intermediate manifold radius 152B is sized larger than the first-end manifold radius 152A. The second-intermediate manifold radius 152C is sized larger than the first-intermediate manifold radius 152B. The second-end manifold radius 152D is sized larger than the second-intermediate manifold radius 152C. The present disclosure, however, is not limited to such exemplary dimensional relationships as the manifold radii may change based on a trajectory of the core flowpath 72 within the turbine section 38 and through the vane array.

Figure 7:
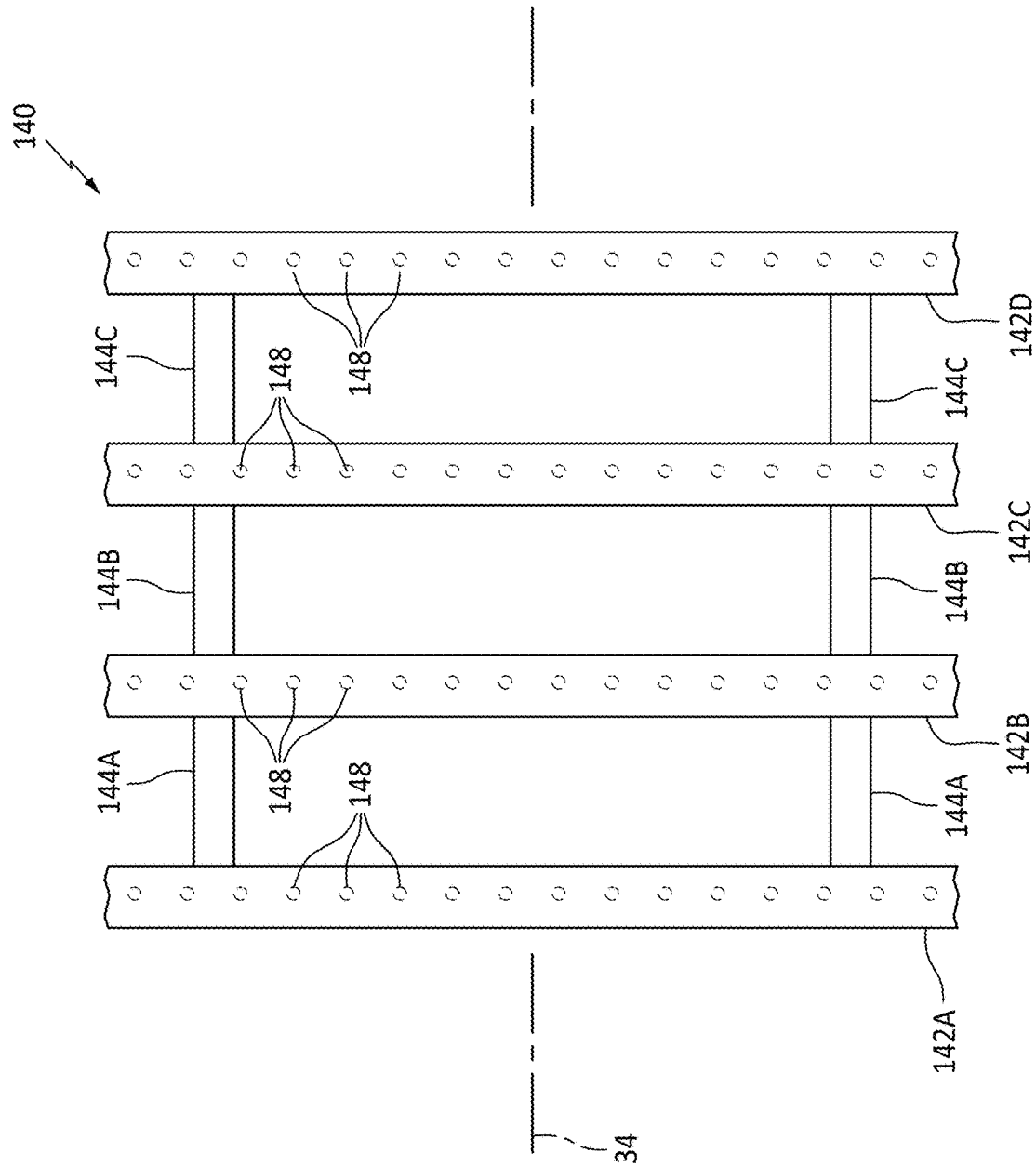
FIG. 7 is a partial plan view illustration of the air delivery device.

Referring to FIG. 7, each set of the conduits 144 are arranged and may be equispaced circumferentially about the axis 34 in a conduit array. Each of the conduits 144 of FIG. 6 extends axially/longitudinally along the outer platform 92 between and to a respective pair of the air delivery manifolds 142. The first-end conduit array and its first-end conduits 144A of FIG. 6 fluidly couple the first-end manifold 142A to the first-intermediate 142B. The intermediate conduit array and its intermediate conduits 144B fluidly couple the first-intermediate 142B to the second-intermediate 142C. The second-end conduit array and its second end conduits 144C fluidly couple the second-intermediate 142C to the second-end 142D. Referring to FIG. 7, each of the conduits 144 is arranged parallel with the axis 34 when viewed, for example, in a reference plane looking radially inward to the axis 34. However, in other embodiments, one or more of the conduits 144 may alternatively be non-parallel to the axis 34 when viewed, for example, in the reference plane.

During operation of the cooling air system 136 of FIG. 6, the air delivery device 140 receives cooling air (e.g., compressor bleed air) from the cooling air source 138. This cooling air flows through the conduits 144 between the air delivery manifolds 142 such that the cooling air flows through each of the air delivery manifolds 142. Each air delivery manifold 142 then directs some of this cooling air out of the air delivery device 140 and into the cooling cavity 120 through the respective air outlets 148. The air outlets 148 may be configured to direct respective jets of the cooling air into the cooling cavity 120 to, for example, impinge against the outer platform 92. Alternatively, some or all of the air outlets 148 may be configured to diffuse the cooling air into the cooling cavity 120. The cooling air within the cooling cavity 120 may cool or otherwise regulate a circumferential and/or axial temperature differential in the vane structure 86 and its outer platform 92, and thereby reduce, eliminate or otherwise control (e.g., tailor) thermal distortions of the vane structure 86 and its outer platform 92.

While the air delivery device 140 is described above with four (4) of the air delivery manifold 142, present disclosure is not limited thereto. For example, any one, two or three of the air delivery manifold 142A-D may be omitted in other embodiments. In another example, the air delivery device 140 may be configured with one or more additional air delivery manifolds 142.

Figure 8:
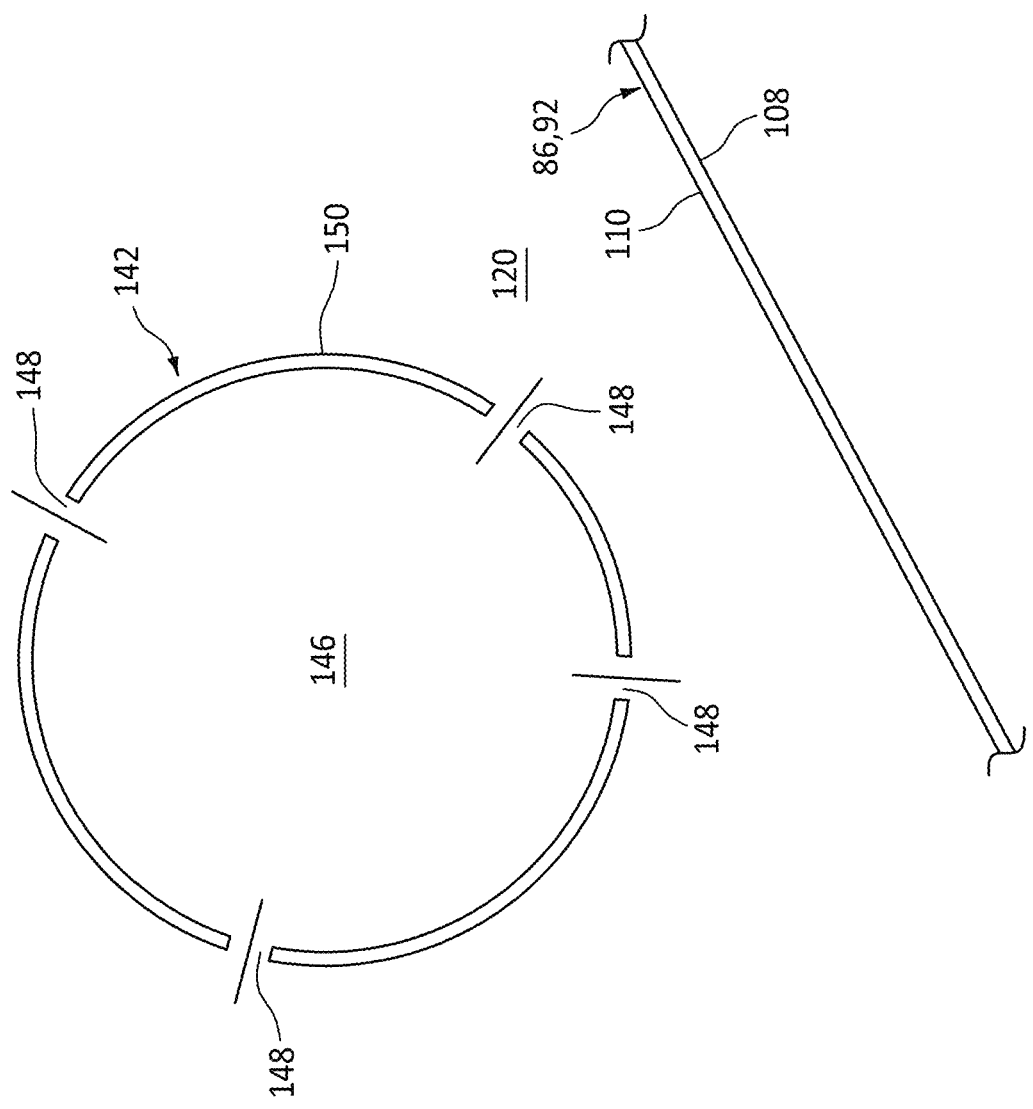
FIG. 8 is a partial side schematic illustration of an air distribution manifold next to a stator vane structure outer platform.
Figure 9:
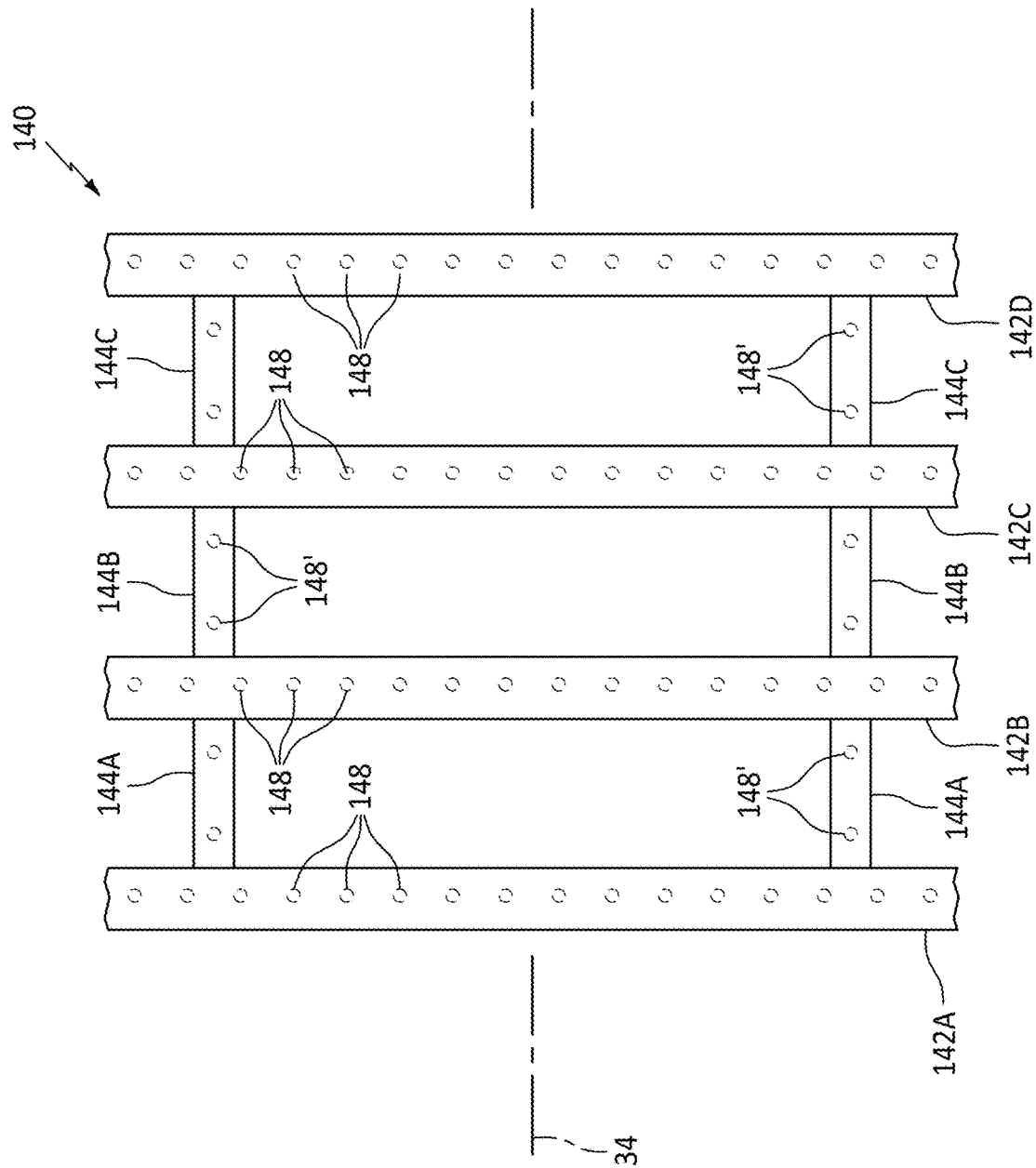
FIG. 9 is a partial plan view illustration of the air delivery device with additional air outlets.

For ease of description and illustration, each air delivery manifold 142 is described above with a single array of the air outlets 148 at its inner periphery. In other embodiments however, referring to FIG. 8, any one or more or all of the air delivery manifolds 142 may each include multiple arrays of the air outlets 148 at its inner periphery and/or one or more arrays of the air outlets 148 at its radial outer periphery or elsewhere. Moreover, while the air outlets 148 are described above as being configured in the air delivery manifolds 142A-D, it is contemplated one, some or all of the conduits 144A, 144B, 144C may also be configured with one or more of the air outlets 148'; e.g., see FIG. 9. The air outlets 148' in each respective conduit 144 (if included) may be disposed at an inner periphery of the conduit 144, an outer periphery of the conduit 144 and/or elsewhere along/about the conduit 144.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
a vane structure including an inner platform, an outer platform and a plurality of vanes arranged circumferentially about an axis, the inner platform extending circumferentially about the axis and forming an inner peripheral boundary of a flowpath through the vane structure, the outer platform extending circumferentially about the axis and forming an outer peripheral boundary of the flowpath through the vane structure, the plurality of vanes extending across the flowpath from the inner platform to the outer platform;
a wall extending circumferentially about the axis, the wall radially outboard of the vane structure with a cavity formed by and radially between the outer platform and the wall; and an air delivery device disposed within the cavity, the air delivery device configured to direct cooling air into the cavity along the outer platform, and the air delivery device including
  a plurality of first outlets arranged circumferentially about the axis in a first outlet array;
  a plurality of second outlets arranged circumferentially about the axis in a second outlet array, the second outlet array axially offset from the first outlet array along the axis; and
  each of the plurality of first outlets and each of the plurality of second outlets configured to direct a flow of the cooling air into the cavity.

2. The assembly of claim 1, wherein the air delivery device further includes
  a first manifold extending circumferentially about the axis, each of the plurality of first outlets extending through a sidewall of the first manifold;
  a second manifold extending circumferentially about the axis, each of the plurality of second outlets extending through a sidewall of the second manifold; and
  a conduit extending axially between and fluidly coupling the first manifold and the second manifold.

3. The assembly of claim 2, wherein the conduit is one of a plurality of conduits arranged circumferentially about the axis in a conduit array, and each of the plurality of conduits extends axially between and fluidly couples the first manifold and the second manifold.

4. The assembly of claim 2, wherein the air delivery device further includes
  a plurality of third outlets arranged circumferentially about the axis in a third outlet array, the second outlet array disposed axially between and offset from the first outlet array and the third outlet array along the axis;
  a third manifold extending circumferentially about the axis, each of the plurality of third outlets extending through a sidewall of the third manifold; and
  a second conduit extending axially between and fluidly coupling the second manifold and the third manifold.

5. The assembly of claim 4, wherein the second conduit is one of a plurality of second conduits arranged circumferentially about the axis in a second conduit array, and each of the plurality of second conduits extends axially between and fluidly couples the second manifold and the third manifold.

6. The assembly of claim 1, wherein the first outlet array and the second outlet array are axially aligned with the plurality of vanes.

7. The assembly of claim 1, wherein
  the first outlet array is axially aligned with the plurality of vanes; and
  the second outlet array is axially offset from the plurality of vanes.

8. The assembly of claim 1, wherein the first outlet array and the second outlet array are axially offset from the plurality of vanes with the plurality of vanes disposed axially between the first outlet array and the second outlet array along the axis.

9. The assembly of claim 1, wherein the wall comprises a turbine engine case housing the vane structure.

10. The assembly of claim 1, further comprising a mid-turbine frame comprising the vane structure.

11. The assembly of claim 1, further comprising:
a first turbine rotor configured to rotate about the axis; and
a second turbine rotor configured to rotate about the axis independent of the first turbine rotor;
the flowpath extending across the first turbine rotor, through the vane structure, and then across the second turbine rotor.

12. The assembly of claim 1, further comprising:
a support structure radially inboard of the vane structure;
a rotating assembly rotatably mounted to the support structure, the rotating assembly comprising a turbine rotor next to the vane structure, and the flowpath extending across the turbine rotor; and
a plurality of struts arranged circumferentially about the axis, each of the plurality of struts extending through a respective one of the plurality of vanes, and the plurality of struts structurally tying the support structure to the wall.

13. The assembly of claim 1, further comprising:
a compressor section;
a combustor section; and
a turbine section;
the flowpath extending through the compressor section, the combustor section and the turbine section from an inlet into the flowpath to an exhaust from the flowpath, and the vane structure disposed along the flowpath within the turbine section.

14. The assembly of claim 13, wherein the turbine section includes a high pressure turbine section and a low pressure turbine section, and the vane structure is disposed along the flowpath between the high pressure turbine section and the low pressure turbine section.

15. An assembly for a turbine engine, comprising:
a mid-turbine frame extending circumferentially about and axially along an axis, the mid-turbine frame including an inner platform, an outer platform and a plurality of vanes that extend radially between and are connected to the inner platform and the outer platform; and
an air delivery device radially outboard of the outer platform, the air delivery device including a plurality of first outlets and a plurality of second outlets, the plurality of first outlets disposed in a circumferentially extending first outlet array, the plurality of second outlets disposed in a circumferentially extending second outlet array that is axially spaced from the circumferentially extending first outlet array along the axis, the air delivery device configured to direct air into an air gap through the plurality of first outlets and the plurality of second outlets, and the air gap extending from the outer platform to an inner periphery of the air delivery device.

16. The assembly of claim 15, further comprising:
an engine case circumscribing the outer platform;
the air delivery device disposed in a cavity formed by and extending radially between the outer platform and the engine case, wherein the air gap comprises a portion of the cavity radially between the air delivery device and the outer platform.

17. An air delivery device for a turbine engine, comprising:
a first manifold extending circumferentially around an axis, the first manifold including a plurality of first outlets arranged circumferentially around the axis in a first outlet array, each of the plurality of first outlets piercing a sidewall of the first manifold at a radial inner periphery of the first manifold;
a second manifold extending circumferentially around the axis, the second manifold including a plurality of second outlets arranged circumferentially around the axis in a second outlet array, each of the plurality of second outlets piercing a sidewall of the second manifold at a radial inner periphery of the second manifold, and an inner radius from the axis to the radial inner periphery of the second manifold greater than an inner radius from the axis to the radial inner periphery of the first manifold;
a third manifold extending circumferentially around the axis, the third manifold including a plurality of third outlets arranged circumferentially around the axis in a third outlet array, each of the plurality of third outlets piercing a sidewall of the third manifold at a radial inner periphery of the third manifold, and an inner radius from the axis to the radial inner periphery of the third manifold greater than the inner radius from the axis to the radial inner periphery of the second manifold;
a plurality of first conduits arranged circumferentially about the axis in a first conduit array, each of the plurality of first conduits extending axially from the first manifold to the second manifold, and each of the plurality of first conduits fluidly coupling the first manifold to the second manifold; and
a plurality of second conduits arranged circumferentially about the axis in a second conduit array, each of the plurality of second conduits extending axially from the second manifold to the third manifold, and each of the plurality of first conduits fluidly coupling the second manifold to the third manifold.

* * * * *